US012638337B2

(12) United States Patent
Blondelet et al.

(10) Patent No.: US 12,638,337 B2
(45) Date of Patent: May 26, 2026

(54) TIRE INSTRUMENTATION METHOD FOR MEASURING THE INTERNAL TEMPERATURE DURING ROLLING

(71) Applicant: COMPAGNIE GENERALE DES ETABLISSEMENTS MICHELIN, Clermont-Ferrand (FR)

(72) Inventors: Michel Blondelet, Clermont-Ferrand (FR); Nicolas Besnard, Clermont-Ferrand (FR); Sylvie Richez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 339 days.

(21) Appl. No.: 18/277,786

(22) PCT Filed: Feb. 14, 2022

(86) PCT No.: PCT/FR2022/050259
§ 371 (c)(1),
(2) Date: Aug. 18, 2023

(87) PCT Pub. No.: WO2022/180320
PCT Pub. Date: Sep. 1, 2022

(65) Prior Publication Data
US 2024/0133750 A1    Apr. 25, 2024
US 2024/0230420 A9    Jul. 11, 2024

(30) Foreign Application Priority Data

Feb. 25, 2021    (FR) ........................................ 2101822

(51) Int. Cl.
*G01K 1/14*      (2021.01)
*B60C 23/20*      (2006.01)

(52) U.S. Cl.
CPC ................ *G01K 1/14* (2013.01); *B60C 23/20* (2013.01); *B60C 2200/065* (2013.01)

(58) Field of Classification Search
None
See application file for complete search history.

(56) References Cited

U.S. PATENT DOCUMENTS 5,731,754 A    3/1998   Lee, Jr. et al.
7,050,017 B2    5/2006   King et al.
(Continued)

FOREIGN PATENT DOCUMENTS

CN      106273113 A     1/2017
DE   102019206265 A1   11/2020
(Continued)

OTHER PUBLICATIONS

International Search Report dated May 31, 2022, in corresponding PCT/FR2022/050259 (5 pages).

*Primary Examiner* — Peter J Macchiarolo
*Assistant Examiner* — Jermaine L Jenkins
(74) *Attorney, Agent, or Firm* — VENABLE LLP

(57) ABSTRACT

A method of instrumentation for a construction plant tire (20) for measures the temperature inside a rubber compound of the tire. The method comprises a step of identifying areas for installing sensors (10) each having a microprocessor, radio transmission means, a temperature measuring probe, and power supply means. The sensors (10) are then inserted in cavities (205, 206, 207) in the rubber compounds, and the sensors are held in a fixed position while the tire (20) is running to communicate the measurement results to a remote receiver located in a vehicle.

12 Claims, 2 Drawing Sheets

(56)        References Cited

U.S. PATENT DOCUMENTS

| | | | |
|---|---|---|---|
| 9,434,409 B2 * | 9/2016 | Singh | B60C 19/00 |
| 10,618,236 B2 | 4/2020 | Custodero et al. | |
| 10,836,223 B1 | 11/2020 | Schessler et al. | |
| 10,953,709 B2 | 3/2021 | Bickard et al. | |
| 11,167,604 B2 | 11/2021 | Delacroix | |
| 11,613,091 B2 * | 3/2023 | Kukkonen | B29D 30/0061 |
| | | | 29/894.3 |
| 2003/0021330 A1 * | 1/2003 | Aubel | B60C 23/0493 |
| | | | 374/142 |
| 2005/0057346 A1 | 3/2005 | Ogawa | |
| 2005/0093761 A1 | 5/2005 | King et al. | |
| 2010/0319446 A1 | 12/2010 | Coue | |
| 2015/0284021 A1 | 10/2015 | Singh | |
| 2016/0076974 A1 | 3/2016 | Abe | |
| 2017/0282657 A1 | 10/2017 | Gyanani | |
| 2019/0315165 A1 | 10/2019 | Delacroix | |
| 2021/0245462 A1 | 8/2021 | Kukkonen et al. | |
| 2022/0219493 A1 | 7/2022 | Sauerwald et al. | |
| 2024/0051358 A1 | 2/2024 | Blondelet et al. | |

FOREIGN PATENT DOCUMENTS

| | | | |
|---|---|---|---|
| EP | 2927074 A1 | 10/2015 | |
| EP | 2988109 A1 | 2/2016 | |
| EP | 3578392 B1 | 7/2020 | |
| FR | 3060463 A1 | 6/2018 | |
| WO | 2004/016454 A1 | 2/2004 | |
| WO | 2008/046766 A1 | 4/2008 | |

* cited by examiner

TIRE INSTRUMENTATION METHOD FOR MEASURING THE INTERNAL TEMPERATURE DURING ROLLING

TECHNICAL FIELD

The present invention relates to a method for instrumenting a tyre for measuring the temperature inside a rubber compound of said tyre when it is running. The tyres that are primarily of interest are fitted to construction plant vehicles for mining.

For example, such vehicles (dumpers or dump trucks) are used in opencast mines for transporting materials extracted from quarries with loads that can reach a mass of over 350 tonnes. The tyres are sized accordingly, and can each weigh around 5 tonnes.

By way of illustration, a tyre to which the invention relates has a standardized designation according to ETRTO (European Tyre and Rim Technical Organisation) of the 59/80 R 63 type, with an inflation pressure of 650 kPa. The outside diameter of the tyre mounted on a rim and inflated to 650 kPa may measure more than 4 metres. Other diameters of 49 to 57 inches can also be found on these vehicles.

Definitions

By convention, in a frame of reference (O, t, y, r), the centre O of which coincides with the centre of the tyre, the circumferential direction (O, t), axial direction (O, y) and radial direction (O, r) refer to a direction tangential to the tread surface of the tyre in the direction of rotation, to a direction parallel to the axis of rotation of the tyre, and to a direction orthogonal to the axis of rotation of the tyre, respectively.

Radially inner and radially outer mean closer to and further away from the axis of rotation of the tyre, respectively.

Axially inner and axially outer mean closer to and further away from the equatorial plane of the tyre, respectively, the equatorial plane of the tyre being the plane that passes through the middle of the tread of the tyre and is perpendicular to the axis of rotation of the tyre.

An elastomeric compound, or rubber compound, is understood to be an elastomeric material obtained by blending its various constituents. An elastomeric compound conventionally comprises an elastomer matrix comprising at least one diene elastomer of the natural or synthetic rubber type, at least one reinforcing filler of the carbon black type and/or of the silica type, a crosslinking system that is usually sulphur-based, and protective agents.

An elastomeric compound can be mechanically characterized, in particular after curing, by its dynamic properties, such as a dynamic shear modulus $G^*=(G'^2+G''^2)^{1/2}$, where G' is the elastic shear modulus and G" is the viscous shear modulus, and a dynamic loss tan $\delta$=G"IG'. The dynamic shear modulus G* and the dynamic loss tan $\delta$ are measured on a Metravib VA4000 viscosity analyser according to the standard ASTM D 5992-96. The response of a sample of vulcanized elastomeric compound in the form of a cylindrical test specimen with a thickness of 4 mm and a cross section of 400 mm², subjected to a simple alternating sinusoidal shear stress at a frequency of 10 Hz, with a strain amplitude sweep from 0.1% to 50% (outward cycle) and then from 50% to 0.1% (return cycle), at a given temperature, for example equal to 60° C., is recorded. These dynamic properties are thus measured for a frequency equal to 10 Hz, a strain equal to 50% of the peak-to-peak strain amplitude, and a temperature that can be equal to 60° C. or 100° C.

An elastomeric compound can also be characterized by static mechanical properties. The tensile tests make it possible to determine the elasticity stresses and the properties at break. Unless indicated otherwise, they are carried out in accordance with the French standard NF T 46-002 of September 1988. The secant moduli known as "nominal" secant moduli (or apparent stresses, in MPa) at 10% elongation (denoted "MA10") and 100% elongation ("MA100") are measured in second elongation (i.e. after an accommodation cycle). All these tensile measurements are carried out under standard temperature (23±2° C.) and hygrometry (50±5% relative humidity) conditions, according to the French standard NF T 40-101 (December 1979). The stresses at break (in MPa) and the elongations at break (in %) are also measured, at a temperature of 23° C.

PRIOR ART

Generally, a tyre comprises a tread intended to come into contact with the ground via a tread surface, the two axial ends of which are connected via two sidewalls to two beads that provide the mechanical connection between the tyre and the rim on which it is intended to be mounted.

A radial tyre also comprises a reinforcement made up of a crown reinforcement radially on the inside of the tread and a carcass reinforcement radially on the inside of the crown reinforcement.

The carcass reinforcement of a radial tyre for a heavy-duty vehicle of construction plant type usually comprises at least one carcass layer comprising generally metal reinforcers that are coated in an elastomer compound that is obtained by blending and is known as a coating compound. A carcass layer comprises a main part that joins the two beads together and is generally wound, in each bead, from the inside of the tyre to the outside, around a usually metal circumferential reinforcing element known as a bead wire so as to form a turn-up. The metal reinforcers of a carcass layer are substantially mutually parallel and form an angle of between 85° and 95° with the circumferential direction.

The crown reinforcement of a radial tyre for a heavy-duty vehicle of construction plant type comprises a superposition of circumferentially extending crown layers, radially on the outside of the carcass reinforcement. Each crown layer is made up of generally metal reinforcers that are mutually parallel and coated in a rubber compound known as a coating compound.

Among the crown layers, a distinction is usually made between the protective layers, which make up the protective reinforcement and are radially outermost, and the working layers, which make up the working reinforcement and are radially comprised between the protective reinforcement and the carcass reinforcement.

The protective reinforcement, which comprises at least one protective layer, essentially protects the working layers from mechanical or physicochemical attacks, which are likely to spread through the tread radially towards the inside of the tyre.

The protective reinforcement of tyres of GC type, such as those described above, usually comprises two radially superposed protective layers formed of elastic metal reinforcers that are mutually parallel in each layer and are crossed from one layer to the next, forming angles at least equal to 10° and at most equal to 35° with the circumferential direction.

The working reinforcement, comprising at least two working layers, has the function of belting the tyre and conferring stiffness and road holding on it. It absorbs both mechanical inflation stresses, which are generated by the tyre inflation pressure and transmitted by the carcass reinforcement, and mechanical stresses caused by running, which are generated as the tyre runs over the ground and are transmitted by the tread. It is also intended to withstand oxidation and impacts and puncturing, notably by virtue of its intrinsic design and that of the protective reinforcement.

The working reinforcement usually comprises two radially superposed working layers formed of inextensible metal reinforcers that are mutually parallel in each layer and are crossed from one layer to the next, forming angles at most equal to 60°, and preferably at least equal to 15° and at most equal to 45°, with the circumferential direction. Here, inextensible metal reinforcers are understood to mean a metal reinforcer characterized by an elongation, under a tensile force equal to 10% of the force at break, at most equal to 0.2%.

In order to reduce the mechanical inflation stresses that are transmitted to the working reinforcement, it is known practice to dispose a hoop reinforcement radially on the outside of the carcass reinforcement. The hoop reinforcement, the function of which is to at least partially absorb the mechanical inflation stresses, improves the endurance of the crown reinforcement by stiffening the crown reinforcement. The hoop reinforcement may be positioned radially on the inside of the working reinforcement, between the two working layers of the working reinforcement, or radially on the outside of the working reinforcement.

The hoop reinforcement usually comprises two radially superposed hooping layers formed of metal reinforcers that are mutually parallel in each layer and are crossed from one layer to the next, forming angles at most equal to 10° with the circumferential direction.

Mining consists in extracting minerals, that is to say rocks from the Earth's crust containing useful minerals or metals in a proportion high enough to justify their exploitation.

The transporting step in mining is essential for its economic viability. The vehicles (dumpers or dump trucks) generally operate without stopping in order to obtain maximum productivity by moving the greatest volume of rubble to be processed by mineral processing operations.

The management of the tyres of the vehicle fleet consists in monitoring the inflation pressure, the temperature, and the wear using a predictive maintenance approach, so as to anticipate malfunctions linked to the tyres and thus to avoid stoppage of the vehicle in order to maximize its period of use.

As a result, one of the expectations of clients in the mining sector is the productivity of the exploitation, which should not be affected by defects in the product, and therefore the period of use of the tyres, which should be as long as possible. It is necessary to avoid stoppages of the vehicles and consequently there is a need to develop preventative maintenance for controlled use of the tyres.

The monitoring of the temperature of the tyres in real time is an essential step for managing the vehicle fleet. The temperature is directly linked to the endurance and the service life of the tyres.

Document FR3060463 proposes a method for estimating the harshness of the use conditions of a tyre mounted on a vehicle. One step of this method involves evaluating the temperature inside a compound, but this evaluation is based on a mathematical model which can be complex to implement in certain cases.

The application WO 2008046766A1 discloses a method for indicating the ageing experienced by a tyre, wherein a temperature is measured locally at least at one point on the tyre. This method requires the installation of a temperature sensor directly in the tyre, which can give rise to additional costs.

To obtain temperature measurements inside the rubber compounds of a tyre, there are conventional methods that make use for example of thermocouples, but these approaches require many interventions to install the thermocouples and take measurements. Moreover, these conventional methods assume that the vehicle has stopped in order to measure the temperature and therefore cause the mining productivity to drop for accurate measurements of the temperature.

Within the context of mining, in which profitability is directly linked to the running time of the vehicles, the approaches described above are not suitable.

There is still a need for accessing the temperatures inside the rubber compounds of a tyre when it is running, in a straightforward, nondestructive and automatic way, without stopping the vehicle of which the tyres are measured. It is necessary to be able to locate the areas of the tyre that are most sensitive to heat in order to measure the temperature in real time. To do this, the running conditions such as the nature of the ground, whether it is stony, muddy or tarmacked, the internal structure of the tyre, or else the topography of the mine need to be taken into consideration.

SUMMARY OF THE INVENTION

To access the temperatures, the inventors have set themselves the objective of finding a method for instrumenting the tyre that incorporates the conditions mentioned above.

The proposed solution is a method for instrumenting a construction plant tyre for measuring the temperature inside the rubber compounds in the areas most sensitive to heat, while the tyres are running. This method comprises the following steps:

a. Identifying, on the outer surface of the tyre, at least one area on the basis of predefined selection criteria, a temperature measuring sensor being intended for insertion into said at least one area;

b. Drilling a cavity in said at least one insertion area identified in the preceding step, with a depth Hc in the drilling direction that is defined by a straight line making an angle Alpha with a radial direction of the tyre at the drilling point;

c. Activating the sensor, which is equipped with a microprocessor, radio transmission means, a temperature measuring probe, and power supply means;

d. Inserting the sensor in the cavity;

e. Fixing the sensor to the bottom and/or on the walls of the cavity using a fixing device;

f. Hermetically closing the cavity by filling means.

A construction plant tyre comprises a tread intended to be in contact with the ground. The nature of the ground varies depending on the use conditions, which are sometimes muddy, stony or tarmacked. To adapt to the various soil types, the tread has cuts, notably transverse, circumferential or oblique cuts, so as to define blocks of rubber compound that are intended to provide sufficient grip irrespective of the nature of the ground to transmit the torque of the vehicle. The blocks of rubber compound of the tread also have sipes for forming flexibility-enhancing sipe blades with a view to promoting grip on snowy ground, for example.

The first step of the tyre instrumentation method consists in examining the outer surface of the tyre to identify sensor insertion areas. This step is based, for example, on the visual expertise of those skilled in the art during the examination of the outer surface of the tyre to detect the sensor insertion areas.

Preferably, one of the predefined selection criteria for the drilling area for the insertion of a temperature measuring sensor consists in being positioned in the tread of the tyre that is intended to be in contact with the ground. Additional criteria can be defined depending on the running conditions such as the nature of the ground, whether it is stony, muddy or tarmacked, the internal structure of the tyre, or else the topography of the mine.

The blocks of rubber compound of the tread are periodically in contact with the ground, and are subjected to severe stresses during running. It follows that the temperature is often very high in these high-strain areas. To avoid any self-combustion of these blocks of rubber, it is important to be able to know their temperature in the event of severe stresses. The insertion of sensors in these blocks of rubber makes it possible to access their temperature levels in real time.

The invention also provides that the areas of the tyre that are located in the lower part of the tyre at the flange of the rim can also be instrumented. These are areas of great bending caused by the tyre being crushed by the load that is carried, which are also sites of elevated temperature owing to the severe strains experienced.

After identifying the insertion areas, the drilling step is done using a drill fitted with an orientable drill bit. The drilling depth HC depends on the internal structure of the tyre, such as the number and stepped arrangement of the crown layers. For the sake of traceability, the drilling angle, Alpha, which is measured between the drilling direction and the radial direction, is recorded, since it is possible to envisage the withdrawal of the sensors from the tyre after the test sessions.

Advantageously, since the sensor has a cylindrical shape, the drilling step is performed using a drill bit with a diameter at most equal to the diameter of the sensor.

This is because, in this configuration, the introduction of the sensor into the cavity is done with natural clamping when the sensor and the cavity have the same diameter. It is easier to keep the sensor in a fixed position in these conditions.

Before the sensor is inserted, it is activated by cutting the activation wire connected to the electrodes of the sensor. The electronic circuit board is then switched on and the communication means are activated. The temperature is measured and averaged over the time interval between two transmissions.

Following the drilling, after precise cleaning of the cavities by removing the rubber residues left by the drilling operation, each sensor is fixed to the bottom and/or on the walls of the cavity.

Preferably, the fixation of the sensor to the bottom and/or on the walls of the cavity is performed by adhesive bonding.

More preferably, the adhesive bonding is performed with a cold-vulcanizing adhesive, and the setting time for the adhesive bonding is at least 24 hours.

A cold-vulcanizing adhesive is understood to mean an adhesive which causes a chemical reaction consisting in incorporating a vulcanizing agent, usually sulfur, with a crude elastomer so as to form bridges between the molecular chains. This operation notably makes the material less plastic but more elastic.

The inventors have observed that the use of such an adhesive within the context of the invention makes it possible to have high-quality adhesive bonding between the sensor and the rubber compound of the cavity.

A preferred example of adhesive is that sold by Tip Top under the "blue cement" name of adhesive.

The setting time of 24 hours ensures a sufficient level of adhesion for the fixation of the sensor in the rubber compound. The sensor thus adhesively bonded to the rubber compound is prevented from making any movement when the tyre is running.

Advantageously, the insertion of the sensor in the cavity drilled in the tyre interacts with a device for evacuating air that is present in the cavity.

When a sensor is being introduced into a cavity, a volume of air forms between the bottom of the cavity and a pushed-in first face of the sensor facing it. This volume of air resists the advancement of the sensor into the cavity. An air evacuation device must be implemented at the same time as the insertion of the sensor.

In one embodiment of the invention, a device for evacuating air from the cavity while the sensor is being inserted comprises a hollow cylindrical tube formed in the sensor, such that the introduction of the sensor into the cavity is accompanied by the expulsion of air through the hollow tube by virtue of the compression of the volume of air located between a first base of the sensor facing the bottom of the cavity.

Once each sensor has been properly fixed in the cavity, in contact with the bottom and the walls, an empty residual volume remains in the cavity radially on the outside of the sensor, which it is necessary to fill in order to protect the sensor. To protect the sensor and to ensure good leaktightness, filling means are filled into the empty volume using a filling object.

Advantageously, means for filling the cavity drilled in the tyre comprise a stopper fixed by adhesive bonding on the walls of the cavity.

Preferably, said means for filling the cavity drilled in the tyre interact with a device for evacuating air that is present in the cavity.

A device for evacuating air from the cavity that is similar to that described above for inserting the sensor in the cavity can be used to insert said filling means this time.

Advantageously, said means for filling the cavity drilled in the tyre comprise a stopper made of the same rubber compound as that forming the walls of the cavity.

The use of the same compound adhesively bonded using a cold-vulcanizing adhesive promotes the adhesion of the two supports and leads to better fixation.

To obtain temperature measurement results throughout the volume of the tyre, advantageously first sensors are positioned along a circumferential direction with a first distribution pitch, and/or second sensors are positioned in an axial direction with a second distribution pitch.

A temperature measurement operation can last from 10 to 15 days. Another subject of the invention is to be able to recover the sensors after the test sessions. For this, the invention also proposes a method for recovering a sensor after the running of a tyre, said sensor having been inserted according to the instrumentation method in a construction plant tyre as described above, said method for recovering a sensor comprising the following steps:

i. Identifying a sensor insertion area on the outer surface of the tyre;

ii. Withdrawing the filling means;

iii. Eliminating the fixation of the sensor to the bottom and/or the walls of the cavity;

iv. Withdrawing the sensor;

v. Filling the cavity.

The gradual wear of the tread could lead to the sensor being ejected into the environment. To avoid this contamination, the sensor is recovered and some of its unaltered components are reused.

Advantageously, the step of recovering the sensor after the running of the tyre comprises a device a step of dissolving the fixing adhesive.

If, for example, the means for filling the cavity are an adhesively bonded stopper as described above, to withdraw the sensor it is necessary first of all to remove the stopper adhesively bonded in the cavity. A dissolution solvent makes it possible to break the adhesion of the adhesive between the stopper and the cavity. The use of a tool in the form of a corkscrew makes it possible to withdraw the stopper. To withdraw the sensor, it is also necessary to use a dissolution solvent to break the adhesion of the adhesive between the surfaces of the sensor and of the cavity. Use is then made of a device comprising a hollow tube which passes through the sensor in the direction of the greatest length of the cavity. Advantageously, the step of recovering the sensor comprises a compressed-air injection device for expelling the sensor. The injection of compressed air into said hollow tube is accompanied by the expulsion of the sensor out of the tyre.

The withdrawal of the stopper, and then of the sensor, results in damage to the tyre. Advantageously, the method for recovering the sensor comprises a step of repairing the tyre after extraction of the stopper and the sensor from the cavity.

The repair step consists for example in filling all of the cavity with a rubber stopper in a manner similar to that described above for the stopper in the instrumentation method. Beforehand, each is cleaned so as to eliminate the residues of rubber compound that may be present there.

The invention also relates to a tyre having a sensor for measuring the internal temperature of a rubber compound, the sensor being installed according to a method as described above for instrumenting a construction plant tyre.

DESCRIPTION OF THE FIGURES

The invention will be better understood on reading the following description, which is given purely by way of nonlimiting example and with reference to FIGS. 1-A, 1-B, 2, 3-A to 3-D, 4-A to 4-D and 5, in which.

DETAILED DESCRIPTION

Figure 1:
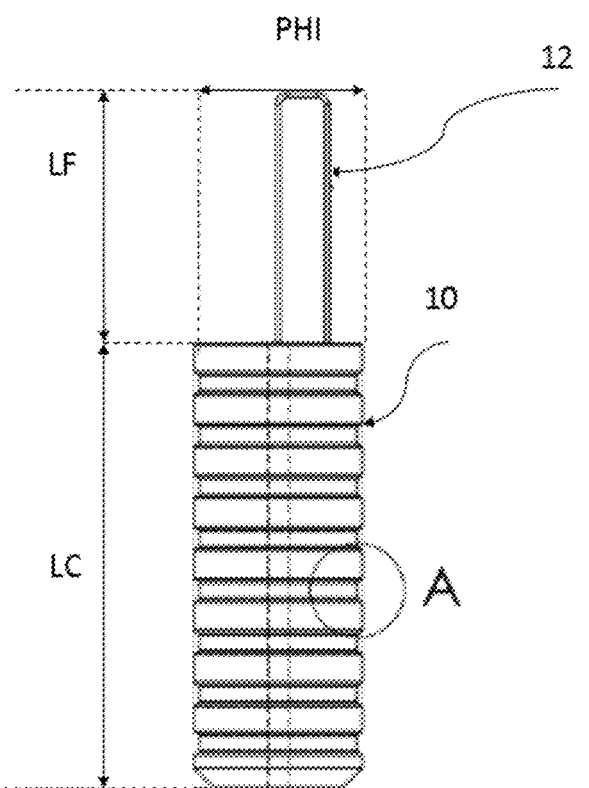
FIGS. 1-A and 1-B depict views of the sensor of the temperature measuring system proposed by the invention.
Figure 1:
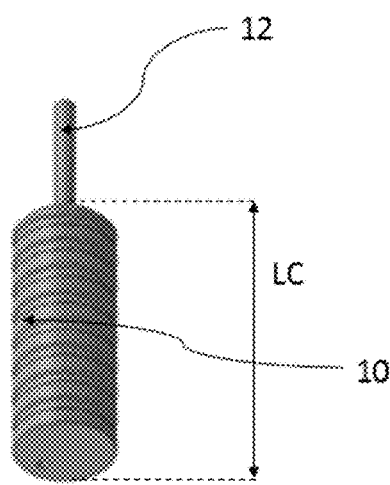

FIG. 1-A shows the sensor 10 which has a geometry of cylindrical shape, with a length LC and a diameter PHI, having an activation wire 12 of length LF. In FIG. 1-B, a volume view of the sensor 10 can be seen. The sensor 10 is intended to be inserted into the tyre 20 of FIG. 2. Reference A in FIG. 1-A shows the grooves which are a succession of recesses and bosses in the longest direction of the sensor, and said grooves are intended to make it easier to anchor the sensor in a rubber compound of the tyre 20.

The tyre 20 is mounted on a vehicle fitted with a device for communicating with said sensor.

The reading means positioned in the vehicle store the data in a database, which is accessible by a remote server. The sensor 10 comprises an electronic circuit board with a circuit connecting the components, such as a temperature measuring probe, a microprocessor, a radio transmitter, and a battery.

Upon activation of the sensor, before it is inserted into the rubber compound, the activation wire 12 is cut at its end in contact with the sensor.

The tyre 20 has a tread 201 which is represented by the radially outermost volume, comprising black dots, of the tyre. The crown reinforcement 210 is formed of a working reinforcement 211, a protective reinforcement 212 and a hoop reinforcement 213, which are outwardly radially superposed. Each reinforcement comprises two layers formed of reinforcers coated in rubber compounds. Lastly, in this example the crown reinforcement comprises six radially superposed crown layers, each formed of reinforcers coated in rubber compounds. Radially on the inside of the crown reinforcement 210 is the carcass reinforcement 220, which comprises at least one carcass layer formed of a main strand 217 which surrounds a bead wire 218 axially from the inside to the outside of the bead and is continued radially outwards by a turn-up strand 216. The reinforcers of the carcass layer make an angle of approximately 90° with the circumferential direction.

This architecture optimizes the endurance of the tyre to bear the load required, but has the drawback of being sensitive to temperature, which catalyses the tyre cracking and damage phenomena, notably at the ends of the crown layers.

Figure 2:
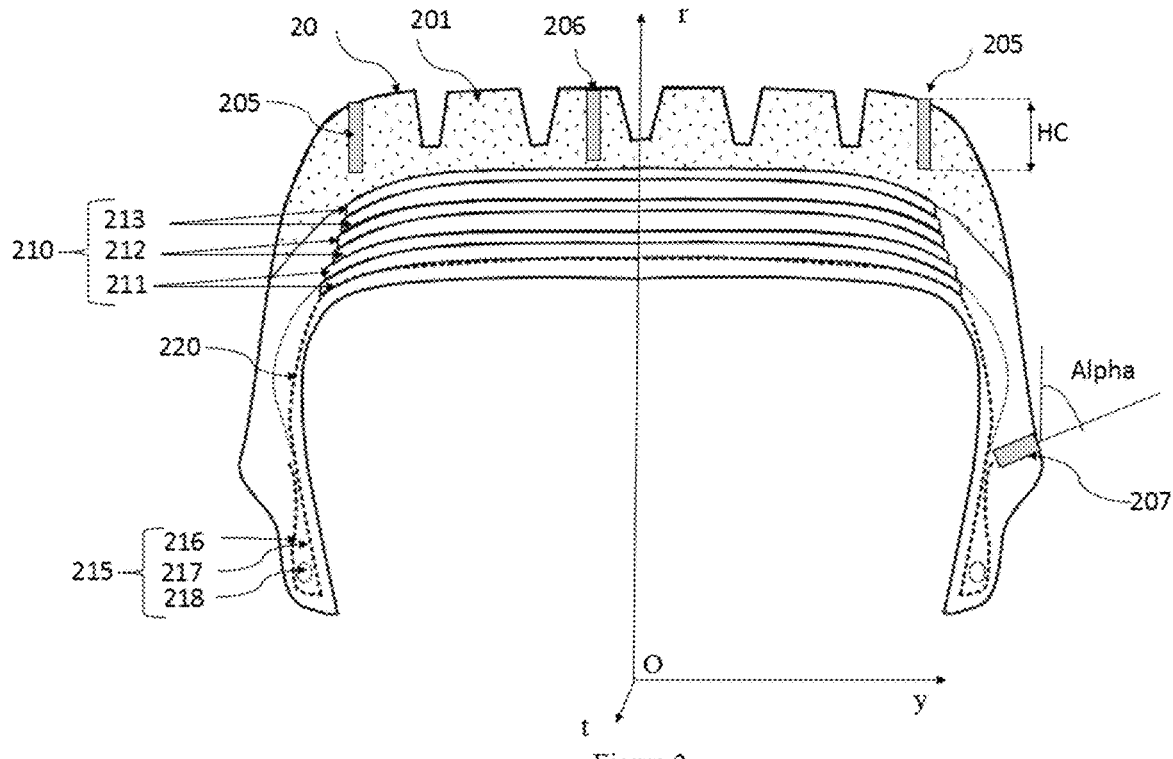
FIG. 2 is a meridian plane (y, r) of the tyre, that is to say a generator plane of the tyre in three dimensions generated by the rotation of this meridian plane about the axis (O, y) of the cylindrical frame of reference (O, t, y, r) associated with the tyre.

Still in FIG. 2, cavities 205 at the end of the crown layers and cavities 206 in the centre of the tread, which are oriented from the outer periphery of the tyre into the rubber compounds, are hollowed out so as to receive a respective temperature measuring sensor 10. The invention also works with cavities 207 which are positioned radially further inwards, where it is possible to visualize the angle Alpha that the drilling direction makes with the radial direction and the depth HC of the cavity. For the cavities 205 and 206, the drilling direction is parallel to the radial direction, and therefore the angle Alpha is zero. In this example, each sensor 10 has a length of 45 mm and a diameter of 17 mm, so as to occupy a relatively small volume with regard to the size of the tyre. This is because it is necessary to be able to extract each sensor without damaging the tyre.

Figure 3:
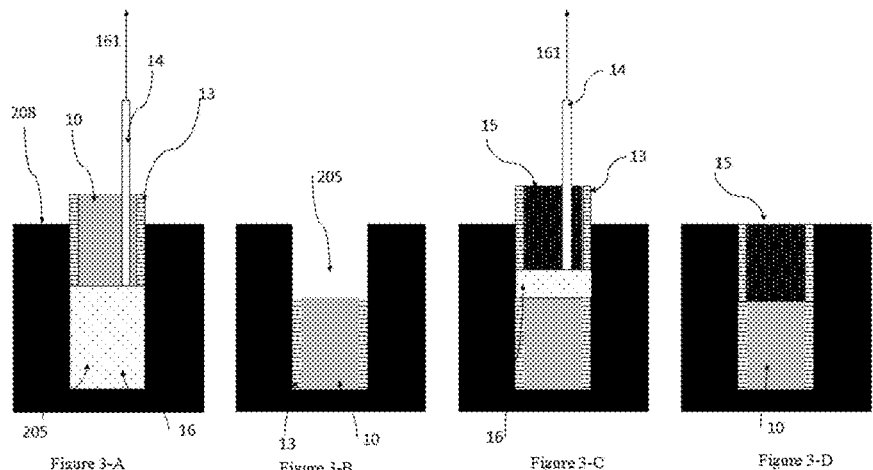
FIGS. 3-A to 3-D depict the different steps for inserting a sensor and a stopper in a cavity hollowed out in a rubber compound of a tyre.

FIGS. 3-A to 3-D show the different steps for inserting a sensor and a stopper in a cavity hollowed out in a rubber compound of a tyre:

i. In FIG. 3-A, a block of rubber compound 208 comprising a cavity 205 filled with air 16 can be seen. A sensor 10 is introduced into the cavity 205. Said sensor 10 comprises a hollow tube 14 passing through the entire length of the sensor 10. The outer surface of the sensor 10 that is intended to be in contact with the walls of the cavity is coated with a layer of adhesive 13. As the sensor 10 is being introduced into the cavity 205, the air 16 is evacuated through the hollow tube 14 along the direction of the arrow 161;

ii. In FIG. 3-B, the sensor is fixed to the bottom and on the walls of the cavity 205. Since the depth of the cavity is greater than the length of the sensor, a residual volume remains empty up to the outer surface of the tyre. To protect the sensor, filling means must be implemented;

iii. In FIG. 3-C, a stopper 15 which comprises a hollow tube 14 and is surrounded by adhesive 13 is inserted in the cavity after the sensor. The air evacuation device is identical to that implemented for the insertion of the sensor into the cavity, the air circulating through the hollow tube 14 along the direction indicated by the arrow 161;

iv. In FIG. 3-D, the sensor 10 and the stopper 15 are installed. The sensor is hermetically sealed in the cavity, protected by the stopper which is made of the same rubber compound as the cavity.

Figure 4:
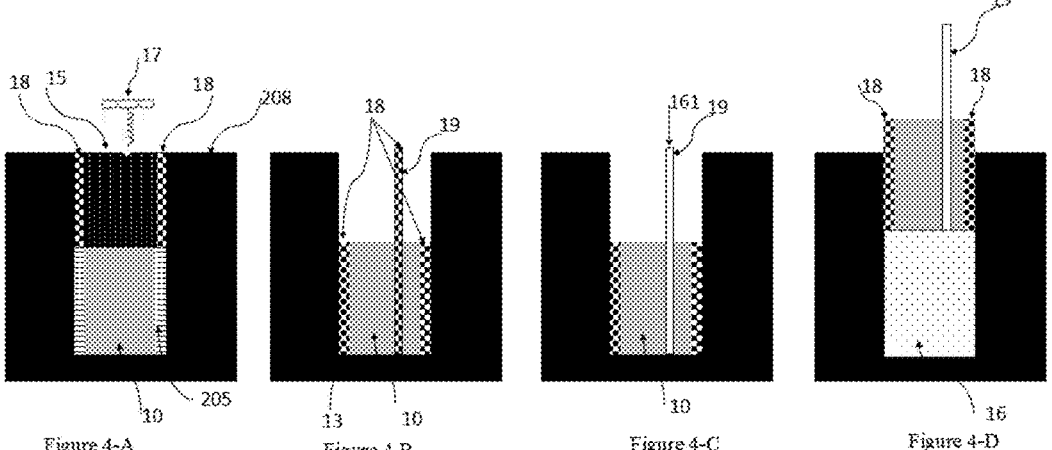
FIGS. 4-A to 4-D relate to the steps for withdrawing a sensor and a stopper from a cavity hollowed out in a rubber compound of a tyre.

FIGS. 4-A to 4-D show the different steps for withdrawing a stopper and a sensor in a cavity hollowed out in a rubber compound of a tyre:

i. In FIG. 4-A, a block of rubber compound 208 comprising a cavity 205 can be seen. Said cavity comprises a sensor 10 adhesively bonded against the walls and the bottom of the cavity using a layer of adhesive 13. The sensor 10 is protected by a stopper 15. A dissolution solvent 18 on either side of that surface of the stopper that is in contact with the walls of the cavity 205 can also be seen. The solvent destroys the bond between the surfaces of the stopper and of the walls of the cavity 205. Therefore, the stopper 15 can be withdrawn with a tool 17 in the form of a corkscrew;

ii. In FIG. 4-B, the stopper is withdrawn, but solvent continues to be poured between the surface of the sensor and that of the cavity so as to separate them. For this, use is made of a hollow tube 19 which passes through the entire length of the sensor down to the bottom of the cavity.

iii. In FIG. 4-C, compressed air indicated by the arrow 161 is injected into the tube 19 formed in the sensor 10, which has been separated from the cavity 205 by the action of the solvent. The compressed air is injected along the direction of the arrow 161;

iv. In FIG. 4-D, the compressed air causes the sensor 10 to rise to the surface and expels it from the cavity.

The invention has been implemented on a tyre of size 59/80 R63 designated by the ETRTO (European Tyre and Rim Technical Organisation) standard which is fitted to a vehicle of dumper truck type. The tyre tested is inflated to 650 kPa.

The front axle of the dumper truck has been fitted with these sizes of tyre mentioned above. The load on the front axle is 63 tonnes.

The sensors have been positioned to measure the temperature close to the crown layers at the shoulders in the cavities 205 and in the centre of the tyre in the cavities 206. These areas have been identified as being those most sensitive to temperature by a digital simulation, taking account of the use of the tyres and notably of the mine that is worked. The test is run over 10 days.

The sensor comprises an electronic circuit board fitted with a temperature measuring probe and a radio transmitter, which can be interrogated by a reader positioned in the vehicle. The temperature probe, the radio transmitter and the reader have conventional references that are commercially available. The period of transmission of data from the sensor to the vehicle is five minutes.

Figure 5:
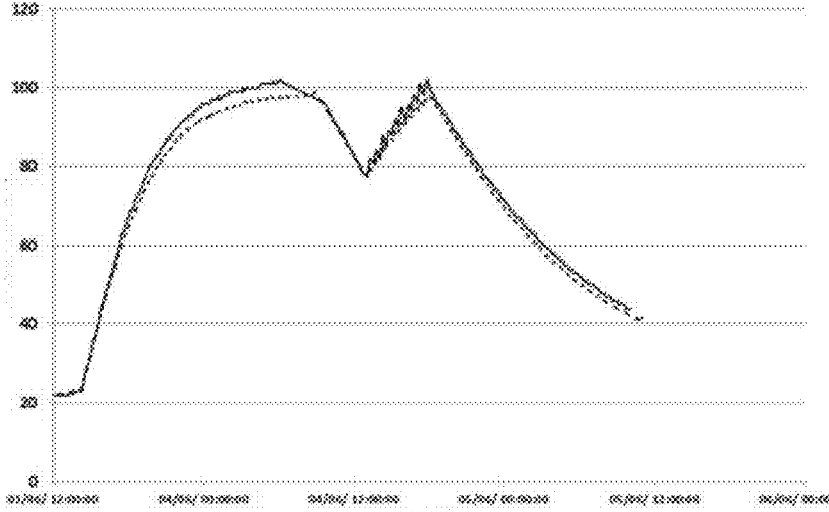
FIG. 5 depicts a curve of results showing a comparison between the temperature measurement results of a conventional method using thermocouples and the instrumentation method of the invention.

In FIG. 5, it is possible to see the comparison between the temperature measured by thermocouples (curve C2 in dashed line) and the temperature measured by the means of the invention (curve C1 in continuous line). The abscissa axis depicts the running time, and the ordinate axis depicts the temperature values measured. This result has been obtained by adding thermocouples to a tyre of the invention to carry out a comparative test under the same stress loading conditions on a suitable machine. The results of measuring the temperature with thermocouples and according to the means of the invention are close enough to confirm the significance of the invention.

The invention has the advantage of accessing the temperature level in rubber compounds easily and automatically, to the detriment of the conventional approaches, for example using thermocouples which can have an adverse effect on the productivity of mining. This is because the vehicles are not stopped and human interventions are limited in the temperature measurement method proposed by the invention.

The measurement means, the method for inserting them, the means for keeping the sensors in a fixed position, and the means for communicating the measured temperature values are supported by these results.

A first example of applying the results of the invention is to adapt the use conditions of the tyres in real time depending on the average temperature level. Warning devices can be installed to inform the driver when the temperature reaches an excessive level.

The principle of the invention can be extrapolated to different types of tyres to those described here, notably of heavy-duty type, and more generally to tyres of which the radial thickness of the tread is sufficient to implement the invention.

The invention claimed is:

1. An instrumentation method for a construction plant tire for measuring a temperature inside a rubber compound of the tire, comprising the following steps:

(a) identifying, on an outer surface of the tire, at least one area on a basis of predefined selection criteria, a temperature measuring sensor being intended for insertion into the at least one area;

(b) drilling a cavity in the at least one area identified in the preceding step, with a depth Hc in a drilling direction that is defined by a straight line making an angle Alpha with a radial direction of the tire at a drilling point;

(c) activating the temperature measuring sensor, which is equipped with a microprocessor, radio transmission means, a temperature measuring probe, and power supply means;

(d) inserting the temperature measuring sensor in the cavity drilled in the tire by interacting with a device for evacuating air that is present in the cavity;

(e) fixing the temperature measuring sensor to a bottom and/or on walls of the cavity; and (f) hermetically closing the cavity.

2. The instrumentation method according to claim 1, wherein one of the predefined selection criteria for the drilling area for the insertion of the temperature measuring sensor consists in being positioned in the tread of the tire that is intended to be in contact with the ground.

3. The instrumentation method according to claim 1, wherein, the temperature measuring sensor having a cylindrical shape, the drilling step is performed using a drill bit with a diameter at most equal to a diameter of the temperature measuring sensor.

4. The instrumentation method according to claim 1, wherein the fixation of the temperature measuring sensor to the bottom and/or on the walls of the cavity is performed by adhesive bonding.

5. The instrumentation method according to claim 4, wherein the adhesive bonding is performed with a cold-vulcanizing adhesive.

6. The instrumentation method according to claim 5, wherein a setting time for the adhesive bonding is at least equal to 24 hours.

7. The instrumentation method according to claim 1, wherein the means for filling the cavity drilled in the tire comprise a stopper fixed by adhesive bonding to internal surfaces of the walls of the cavity.

8. The instrumentation method according to claim 1, wherein the insertion of the means for filling the cavity drilled in the tire interact with the device for evacuating air that is present in the cavity.

9. The instrumentation method according to claim 1, wherein the means for filling the cavity drilled in the tire comprise a stopper made of a same rubber compound as that forming the walls of the cavity.

10. The instrumentation method according to claim 1, wherein first temperature measuring sensors are positioned along a circumferential direction with a first distribution pitch, and/or second temperature measuring sensors are positioned in an axial direction with a second distribution pitch.

11. A method for recovering a sensor after running of a tire, comprising the following steps:

(i) identifying a sensor insertion cavity on an outer surface of the tire;

(ii) withdrawing filling means;

(iii) eliminating a fixation of the sensor to a bottom and/or walls of the cavity;

(iv) withdrawing the sensor using a compressed-air injection device; and (v) filling the cavity.

12. The method according to claim 11, wherein the method includes a step of dissolving fixing adhesive.

\* \* \* \* \*